(12) United States Patent
Watanabe et al.

(10) Patent No.: US 9,440,500 B2
(45) Date of Patent: Sep. 13, 2016

(54) PNEUMATIC TIRE

(71) Applicant: BRIDGESTONE CORPORATION, Chuo-ku, Tokyo (JP)

(72) Inventors: Toshiyuki Watanabe, Kodaira (JP); Yoshiyuki Waki, Kodaira (JP); Taiga Ishihara, Kodaira (JP); Hidetoshi Yokota, Kodaira (JP); Seiji Ishikawa, Kodaira (JP); Kento Hirohata, Kodaira (JP); Akio Kusano, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 198 days.

(21) Appl. No.: 14/162,414

(22) Filed: Jan. 23, 2014

(65) Prior Publication Data
US 2014/0224400 A1 Aug. 14, 2014

(30) Foreign Application Priority Data

Feb. 13, 2013 (JP) .................................. 2013-025673

(51) Int. Cl.
*B60C 19/00* (2006.01)

(52) U.S. Cl.
CPC ...... *B60C 19/002* (2013.04); *Y10T 152/10513* (2015.01)

(58) Field of Classification Search
CPC .................................................. B60C 19/002
See application file for complete search history.

(56) References Cited

U.S. PATENT DOCUMENTS

| | | | | |
|---|---|---|---|---|
| 4,078,596 A | * | 3/1978 | Nakayama | .......... B60C 11/0306 152/209.22 |
| 6,343,843 B1 | * | 2/2002 | Nishikawa | ............ B60B 21/023 139/391 |
| 7,886,788 B2 | * | 2/2011 | Yukawa | ................ B60C 19/002 152/209.1 |

FOREIGN PATENT DOCUMENTS

| | | | |
|---|---|---|---|
| DE | 2040898 | * | 2/1972 |
| JP | 2004-082387 A | | 3/2004 |
| JP | 2005-262920 A | | 9/2005 |
| JP | 2009-45747 A | | 3/2009 |
| JP | 2012-250635 A | | 12/2012 |
| WO | WO2008/142914 | * | 11/2008 |
| WO | 20120073721 A1 | | 6/2012 |
| WO | WO2012/164960 | * | 12/2012 |

OTHER PUBLICATIONS

English machine translation of WO2008/142914, dated Nov. 2008.*
English machine translation of WO2012/164960, dated Dec. 2012.*
Japanese Office Action, dated Jan. 28, 2014, issued in corresponding Japanese Patent Application No. 2013-025673.

* cited by examiner

*Primary Examiner* — Justin Fischer
*Assistant Examiner* — Robert Dye
(74) *Attorney, Agent, or Firm* — Sughrue Mion, PLLC

(57) ABSTRACT

A pneumatic tire in which a cavity resonance sound is reduced while punctures are easily repaired with a puncture sealant. The pneumatic tire has a fibrous region where short fibers are bonded onto an inner surface of the tire. A circumferential fiberless region where short fibers are not bonded onto the inner surface of the tire extends circumferentially between both ends of a tread ground contact area.

4 Claims, 2 Drawing Sheets

PNEUMATIC TIRE

CROSS-REFERENCE TO RELATED APPLICATION

This application claims priority to and the benefit of Japanese Patent Application No. 2013-025673 filed Feb. 13, 2013, the entire contents of which are incorporated herein by reference.

TECHNICAL FIELD

The present invention particularly relates to a pneumatic tire capable of reducing a cavity resonance sound while facilitating repair of puncture damage with a puncture sealant.

BACKGROUND ART

One of factors causing noise from a pneumatic tire is the cavity resonance sound phenomenon due to the vibration of the air filled inside the tire. The cavity resonance sound phenomenon refers to a resonance phenomenon occurring inside the tire where a tread surface of a rotating tire contacts an uneven road surface during the rotation and vibrates to cause an internal air vibration. For example, with regard to a general pneumatic tire for a passenger vehicle, the cavity resonance sound having a frequency of 200 Hz-270 Hz is a harsh sound as an interior noise of the vehicle.

A technology of absorbing the cavity resonance sound (sound absorbing) by placing a sound absorbing material inside the tire has been proposed in order to reduce the sound generated by the cavity resonance sound phenomenon (hereinafter referred to as "cavity resonance sound"). For example, it is well known as an effective measure that short fibers having sound absorbing properties are bonded onto the inner surface of the tire with an electrostatic flocking (see Patent Literature 1).

Meanwhile, it is known as a method for repairing a punctured tire to use a puncture repair liquid containing a puncture sealant. In this method, the puncture repair liquid is injected inside the tire from a valve of a wheel, and the injected puncture repair liquid is then circumferentially spread over an inner surface of the tire by rotating the tire. Once the puncture sealant reaches the punctured portion and is cured, the repair of the tire is completed.

CITATION LIST

Patent Literature

PTL 1: JP2004082387

SUMMARY OF INVENTION

However, the short fibers which are bonded onto the inner surface of the pneumatic tire in order to reduce the cavity resonance sound absorb the puncture repair liquid, which impedes the liquid flow on the inner surface of the tire. As a result, it is difficult to spread the puncture sealant sufficiently over the inner surface of the pneumatic tire bonded with the short fibers, and therefore a relatively large amount of puncture repair liquid is required to repair the puncture damage.

The present invention is intended to provide a pneumatic tire capable of reducing the cavity resonance sound while facilitating repair of the puncture damage with a puncture sealant.

The present invention is summarized as follows: A pneumatic tire according to a first embodiment of the present invention has a fibrous region where short fibers are bonded onto an inner surface of the tire, and comprises a circumferential fiberless region where short fibers are not bonded onto the inner surface of the tire, the circumferential fiberless region extending circumferentially, and disposed on the inner surface of the tire within a tread ground contact area. This configuration allows the puncture repair liquid to be easily spread in the circumferential direction of the tire, and eventually over the inner surface of the tire, whereby the puncture repair liquid required to repair the puncture damage can be reduced. Therefore, it is possible provide a pneumatic tire capable of reducing the cavity resonance sound while facilitating repair of the puncture damage with a puncture sealant. It is noted that the term "inner surface of the tire" refers to a surface that is exposed to an inside cavity of the tire under the condition that the pneumatic tire is mounted onto an applicable rim and filled to a predetermined air pressure. The term "applicable rim" as used herein refers to a rim defined by a valid industrial standard in areas where tires are manufactured and used. For example, it is defined, in Japan, by JATMA (Japan Automobile Tire Manufacturers Association) YEAR BOOK; in Europe, by ETRTO (European Tyre and Rim Technical Organisation) STANDARD MANUAL; and in the United States, by TRA (THE TIRE and RIM ASSOCIATION INC.) YEAR BOOK. The term "predetermined air pressure" as used herein refers to an air pressure (the maximum air pressure) corresponding to a predetermined load for a tire of an applicable size. The term "predetermined load" as used herein refers to the maximum tire load defined by the above mentioned standard such as JATMA. The term "both ends of a tread ground contact area" refers to both widthwise ends of the tread on a contact surface of the pneumatic tire when it is mounted onto the applicable rim, filled to the predetermined air pressure, placed, in a stationary state, perpendicular on a flat plate, and applied with a load corresponding to a predetermined mass. In addition, the term "extending circumferentially" does not necessarily refer to an extension exactly in the circumferential direction of the tire, but may refer to an extension in a direction having a circumferential component. It is also noted that the term "fiberless region" refers to a region where the short fibers are not substantially bonded over at least 1 mm in the width direction of the tire. The term "tread contact width" refers to the maximum linear distance between both ends of the tread ground contact area in an axial direction of the tire. In addition, the circumferential fiberless region is not limited to extending linearly along the circumferential direction of the tire, but may refer to extending in a zigzag manner, a wavy manner or the like in the circumferential direction of the tire. Unless otherwise specified, the various dimensions of the pneumatic tire of the present invention refer to dimensions under the state that the tire is mounted onto the applicable rim and filled with predetermined air pressure with no load applied on the tire.

Further, in a widthwise cross-sectional view of the tire, the circumferential fiberless region may be situated in a tread center portion and has a width equal to a tread contact half-width, and with an equatorial plane of the tire as a center of the width of the circumferential fiberless region. The above configuration further facilitates repair of the puncture damage with a puncture sealant. In addition, it can also reduce (suppress the increase of) a rolling resistance of the pneumatic tire. It is noted that the term "tread contact half-width" refers to a width half as large as the tread contact width.

Further, the pneumatic tire according to the first embodiment of the present invention may include grooves and land portions defined by the grooves on a tread surface, wherein the following relationship is satisfied: T1/S1>T2/S2, where S1 is an area of groove regions on the inner surface of the tire corresponding to the grooves; S2 is an area of land regions on the inner surface of the tire corresponding to the land portions; T1 is an area of the fibrous region in the groove regions; and T2 is an area of fibrous region in the land region. The above configuration can further suppress a decrease in steering stability of the pneumatic tire. It is noted that the term "tread surface" refers to a surface that contacts a flat plate when the tire is mounted onto an applicable rim, filled with a predetermined air pressure, and placed, in a stationary state, perpendicular on the flat plate. The term "groove region" refers to a region on the inner surface of the tire located, in the widthwise cross-sectional view, between two intersections where two radially extending imaginary lines passing through respective widthwise groove ends intersect with the inner surface of the tire. In the same manner, the term "land region" refers to a region on the inner surface of the tire located, in the widthwise cross-sectional view, between two intersections where two radially extending imaginary lines passing through respective widthwise land ends intersect with the inner surface of the tire.

Furthermore, the pneumatic tire according to the first embodiment of the present invention may further comprise a widthwise fiberless region where short fibers are not bonded to the inner surface of the tire, the widthwise fiberless region extending widthwise from the circumferential fiberless region. The above configuration can further facilitate repair of the puncture damage with the puncture repair liquid containing a puncture sealant. It is noted that the expression "extending widthwise" does not necessarily refer to extending exactly in the width direction of the tire, but may refer to extending in a direction having a widthwise component. Moreover, the widthwise fiberless region is not limited to refer to extending linearly along the width direction of the tire, but refer to extending in a zigzag manner, a wavy manner or the like in the width direction of the tire.

Further, the widthwise fiberless regions may be provided at a constant interval in a circumferential direction of the tread, the circumferential ends of each of the widthwise fiberless regions interposed between fibrous regions. The above configuration can enhance the effect of reducing the cavity resonance sound while facilitating repair of the puncture damage with the puncture repair liquid containing the puncture sealant.

According to the pneumatic tire of the present invention, it is possible to provide a pneumatic tire capable of reducing the cavity resonance sound while facilitating repair of the puncture damage with the puncture sealant.

DESCRIPTION OF EMBODIMENTS

Embodiments of a pneumatic tire of the present invention are described in detail below with reference to the drawings.

Figure 1:
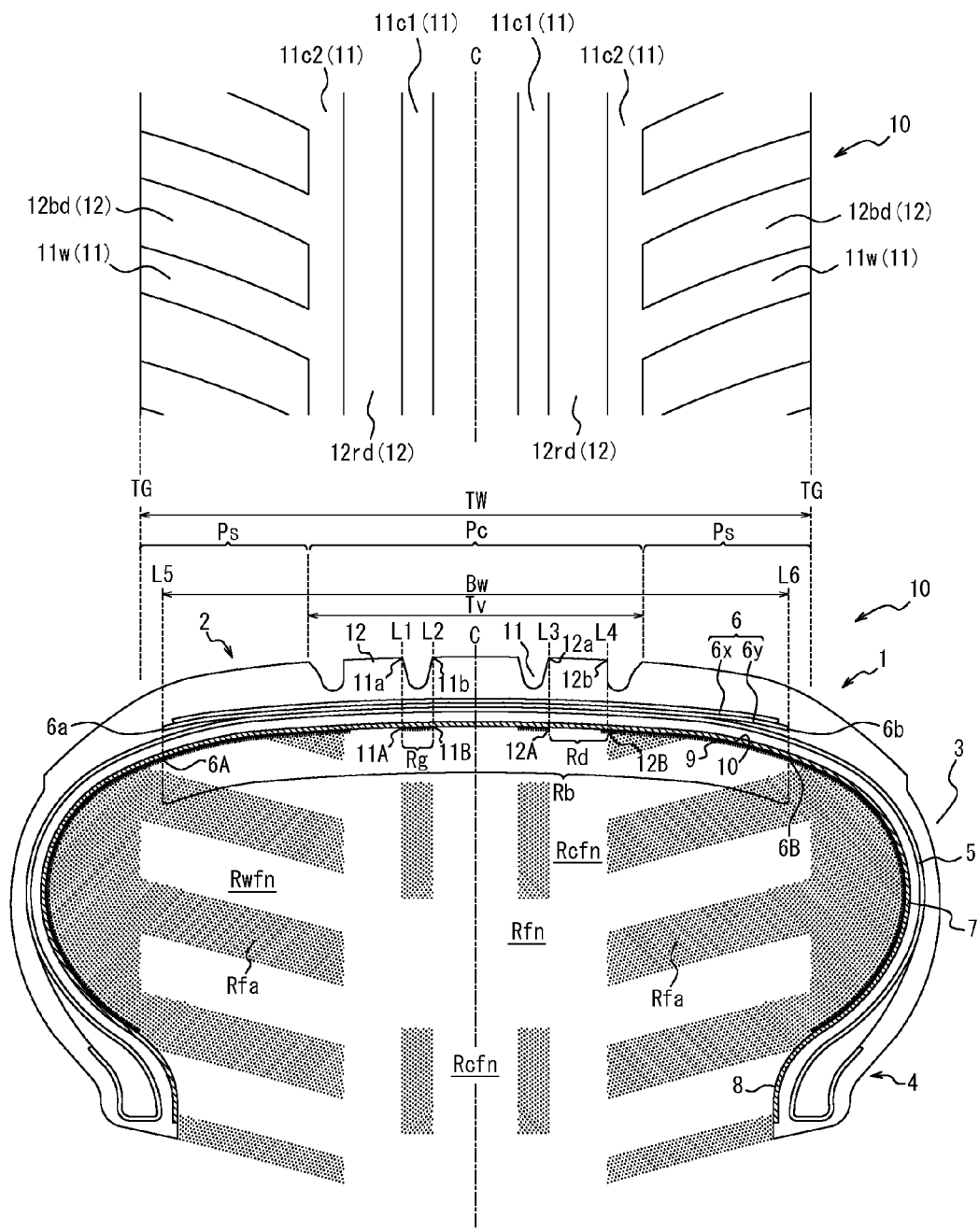
FIG. 1 is a widthwise cross-sectional view of a pneumatic tire according to one example of the present invention.

FIG. 1 is a widthwise cross-sectional view of a pneumatic tire according to an example of the present invention. The pneumatic tire 1 according to an example of the present invention includes: a tread portion 2, a pair of sidewall portions 3 extending radially inwardly from respective sides of the tread portion 2, a pair of bead portions 4 extending radially inwardly from the respective side wall portions 3.

Further, the tire 1 includes a carcass 5 formed of a ply extending toroidally between the pair of bead portions 4, two layers of belt layers 6 (6x, 6y) consisting of a plurality of ply cords covered with rubber located radially outwardly from the carcass 5 of the tread portion 2. In addition, an inner liner 7 is disposed on the further inner side from the carcass 5 of the tire in order to maintain the internal pressure of the pneumatic tire. The surface of the inner liner 7 forms an inner surface 8 of the tire 1.

The pneumatic tire 1 according to an example of the present invention is required to include a fibrous region Rfa where short fibers are bonded onto the inner surface 8 of the tire and a fiberless region Rfn where short fibers are not bonded onto the inner surface of the tire.

<Fibrous Region>

As shown in FIG. 1, a number of the short fibers 9 are bonded by an adhesive 10 onto the surface of the inner liner 7 forming the inner surface 8 of the tire 1.

In the tire 1 of the present embodiment, the ratio of the area of fibrous region Rfa to the surface area of the tire inner surface 8 is preferably 25% or more. This range of the ratio ensures a reduction of cavity resonance sound.

Further, the fibrous region Rfa is non-continuous, in other words, groups of the short fibers are arranged independently from each other in the tire of the present embodiment. When the short fibers bonded in a certain position are peeling off from the inner surface of the tire, this non-continuous configuration can impede the peeling from spreading further on the inner surface of the tire. Compared with the tire with the continuous fibrous region, this non-continuous configuration can thus reduce cavity resonance sound for longer time periods.

<Fiberless Region (Circumferential Fiberless Region>

The tire 1 of the present embodiment is required to include a circumferential fiberless region Rcfn where short fibers are not bonded onto the inner surface 8 of the tire, and the circumferential fiberless region extends continuously circumferentially between tread ground contact ends TG, TG.

When the pneumatic tire has the circumferential fiberless region Rcfn extending continuously circumferentially, the liquid flow of the puncture repair sealant on the inner surface of the tire is less likely to be hindered. As a result, the puncture repair liquid can easily spread in the circumferential direction of the tire, and eventually over the inner surface of the tire, to, thereby, reduce the amount of puncture repair liquid required for repair of the puncture damage. Accordingly, with the above configuration, it is possible to provide a pneumatic tire capable of reducing the cavity resonance sound while facilitating repair of the puncture damage with the puncture repair liquid containing the puncture sealant.

Hereinafter, in a widthwise cross-sectional view of the tire, a tread portion situated widthwise within a range of a tread contact half-width Tv with an equatorial plane of the tire as a center thereof is referred to as a tread center portion Pc, and tread portions situated between the widthwise outermost portions of the tread center portion Pc and the respective ends of the tread ground contact ends TG are referred to as tread shoulder portions Ps.

As shown in FIG. 1, the embodiment of the pneumatic tire 1 of the present embodiment has a circumferential fiberless region Rcfn in the tread center portion Pc.

After the puncture repair liquid is introduced into the tire through the valve of the wheel, the puncture repair liquid tends to collect on the inner surface 8 of the tire of the tread center portion Pc during the rotation of the tire. Accordingly, the pneumatic tire having the circumferential fiberless region Rcfn on the tread center portion Pc allows the puncture repair liquid to spread more easily in the circumferential direction of the tire, and eventually over the inner surface of the tire, which can further reduce the amount of puncture repair liquid required for repair of a puncture damage repair and can thus facilitate repair of the puncture damage.

When the short fibers 9 are bonded onto the inner surface 8 of the tire, the weight of the tire increases, which leads to an increase of the rolling resistance. Therefore, the fuel consumption of a vehicle equipped with these tires rises. As the radius of rotation of the tread center portion Pc is larger than the radius of rotation of the tread shoulder portion Ps during the rotation of the tire, the increase in the rolling resistance due to short fibers 9 bonded onto the tread center portion Pc is more remarkable in the tread center portion Pc than in the tread shoulder portions Ps. Conversely, the reduction in rolling resistance resulting from no short fibers 9 being bonded onto the tread center portion Pc is more remarkable in the tread center portion Pc than in the tread shoulder portions Ps. Therefore, when the pneumatic tire has the circumferential fiberless region Rcfn on the tread center portion Pc, the rolling resistance of the tire can be reduced (or the increase of the rolling resistance of the tire can be suppressed).

<Fiberless Region (Widthwise Fiberless Region)>

As shown in FIG. 1, the tire 1 of the present embodiment further includes widthwise fiberless regions Rwfn where short fibers 9 are not bonded onto the inner surface of the tire, the widthwise fiberless regions extending widthwise from the circumferential fiberless region Rcfn.

When the pneumatic tire further includes the widthwise fiberless regions Rwfn, the puncture repair liquid can easily spread not only in the circumferential direction but also in the width direction of the tire. This can further reduce the puncture repair liquid required for repair of the puncture damage to further facilitate repair of the puncture damage of the pneumatic tire.

In FIG. 1, the widthwise fiberless regions Rwfn are provided at a constant interval in a circumferential direction of the tread, the circumferential ends of each of the widthwise fiberless regions Rwfn are interposed between circumferential fibrous regions Rfa. This configuration enhances the effect of reducing the cavity resonance sound while facilitating repair of the puncture damage with the puncture repair liquid containing the puncture sealant.

In the widthwise cross-sectional view, points 6A, 6B represent intersections of radially extending imaginary lines L5, L6, respectively, passing through widthwise ends 6a, 6b, respectively, of the belt layer 6 and the inner surface 8 of the tire. In this state, a region situated between the points 6A and 6B on the inner surface 8 of the tire is referred to as a belt corresponding region Rb that is a projection of the belt layer 6 on the inner surface 8 of the tire. Hereinafter, the area of the fiberless regions Rfn consisting of the circumferential fiberless regions Rcfn and the widthwise fiberless regions Rwfn in the belt corresponding region Rb is denoted by Tb, and the area of the belt corresponding region Rb is denoted by Sb.

The ratio Tb/Sb is preferably 0.05 or more and less than 1.0. When the ratio Tb/Sb is less than 0.05, short fibers absorb most of the puncture repair liquid, which greatly reduces the efficiency of repair of the puncture damage. When the ratio Tb/Sb is 1.0, the cavity resonance sound cannot be reduced effectively. For the same reasons, the ratio Tb/Sb is more preferably between 0.1 and 0.5.

The width of the circumferential fiberless region Rcfn in the width direction of the tire is preferably 0.05 TW or more and less than 1.0 TW, where TW is a tread contact width. When the width is less than 0.05 TW, the short fibers 9 absorb most of the puncture repair liquid, which greatly reduces puncture repair efficiency. When the width is 1.0 TW, the cavity resonance sound cannot be reduced effectively. For the same reasons, the width of the circumferential fiberless region Rcfn in the width direction of the tire is more preferably 0.1 TW or more and 0.50 TW or less.

In regards to the tread surface, as shown in FIG. 1, the pneumatic tire 1 of the present embodiment includes grooves 11 and land portions 12 defined by the grooves 11 on a tread surface 10.

In the widthwise cross-sectional view, points 11A, 11B represent intersections of radially extending imaginary lines L1, L2, respectively, passing through widthwise ends 11a, 11b, respectively, of the opening of the groove 11 and the inner surface of the tire. In this state, the region situated between the points 11A, 11B on the inner surface 8 of the tire is referred to as a groove corresponding region Rg that is a projection of the groove 11 on the inner surface 8 of the tire (only one groove 11 is shown in FIG. 1). In addition, in the widthwise cross-sectional view, points 12A, 12B represent intersections of radially extending imaginary lines L3, L4, respectively, passing through widthwise ends 12a, 12b, respectively, of the land portion 12 and the inner surface of the tire. In this state, the region situated between 12A and 12B on the inner surface 8 of the tire is referred to as a land corresponding region Rd that is a projection of the land portion 12 on the inner surface 8 of the tire (only one land portion 12 is shown in FIG. 1). Hereinafter, S1 denotes an area of the groove corresponding region Rg, S2 denotes an area of the land corresponding region Rd, T1 denotes an area of the fibrous region in the groove corresponding region Rg, and T2 is an area of the fibrous region in the land corresponding region Rd.

In this state, the pneumatic tire 1 of the present embodiment preferably satisfies the relationship: T1/S1>T2/S2. The rigidity of the tread portion where the grooves 11 are provided is lower than that of the tread portion where the land portions 12 are provided. When the above relationship is satisfied, the short fibers 9 can be bonded over a relatively large area of the tread portion where the grooves 11 are provided and thus the rigidity is relatively small to, thereby, increase the rigidity of the tread portion relatively largely. Therefore, when the pneumatic tire satisfies the relationship T1/S1>T2/S2, it is possible to uniformly increase the rigidity of the tread portion 2, so that deterioration of steering stability of the pneumatic tire can be further suppressed.

As shown in FIG. 1, the fibrous region Rfa is only provided in the corresponding groove regions Rg on the tread surface 10, so that the pneumatic tire 1 of the present embodiment satisfies the above relationship. However, the pneumatic tire of the present invention is not limited to the above relationship. For example, the fibrous regions Rfa may be provided in the land corresponding regions Rd.

The pneumatic tire of one embodiment preferably satisfies the relationships T1/S1=1, and $0 \leq T2/S2 \leq 0.8$. When the ratio T1/S1 is 1, the short fibers 9 can be bonded over the entire surface of the tread portion where the grooves 11 with relatively low rigidity are provided. As a result, the rigidity of the tread portion can be increased. When T2/S2>0.8 is satisfied, the short fibers 9 absorb most of the liquid puncture repair sealant, the efficiency of repair of the puncture damage is greatly reduced. For the same reasons, the pneumatic tire 1 of the embodiment more preferably satisfies the relationships T1/S1=1 and 0≤T2/S2≤0.5.

The pneumatic tire according to the embodiment shown in FIG. 1 further includes, on the tread surface 10, circumferential grooves 11c1, 11c2 (11c) extending continuously along the circumferential direction of the tire, and rib-shaped land portions 12rd defined by the circumferential grooves 11c1, 11c2. The pneumatic tire further includes widthwise grooves 11w extending widthwise from the circumferential grooves 11c2 toward tread contact ends TG, and rib-shaped land portions 12bd defined by the circumferential grooves 11c2 and the widthwise grooves 11w. In the tire 1, the circumferential fiberless region Rcfn of the tire 1 occupies the land corresponding regions corresponding to the rib-shaped land portions 12rd; the widthwise fiberless region Rwfn occupies the land corresponding regions corresponding to the block-shaped land portions 12bd; and the fibrous regions Rfa occupy a part of the groove corresponding regions corresponding to the circumferential grooves 11c1, a part of the groove corresponding regions corresponding to the circumferential grooves 11c2 and the groove corresponding regions corresponding to the widthwise grooves 11w.

In this way, Rcfn occupies the land corresponding regions, and Rwfn occupies the groove corresponding regions, so that the relationship T1/S1>T2/S2 can be easily satisfied. Therefore, the deterioration of stability of the pneumatic tire can be further suppressed, and the puncture repair liquid can easily spread over the inner surface of the tire during puncture repair to further facilitate repair of the puncture damage of the pneumatic tire.

It is noted that the inclination angle of the circumferential grooves 11c with respect to the circumferential direction of the tire can be 10° or less. The term "inclination angle of the circumferential grooves with respect to the circumferential direction of the tire" as used herein refers to the smaller angle formed between the extending direction of the circumferential grooves and the circumferential direction of the tire form angles.

The width of the circumferential groove 11c is preferably 4 mm to 8 mm. When the width of the circumferential groove 11c is 4 mm or more, the drainage of the circumferential groove 11c can be improved, and therefore, the wet performance of the pneumatic tire can also be improved. When the width of the circumferential grooves 11c is 8 mm or less, the area of the land portion 12 can be secured, and therefore, traction performance of the pneumatic tire can be ensured.

In the pneumatic tire 1 of the embodiment shown in FIG. 1, a number of the short fibers 9 are bonded onto the inner surface 8 of a sidewall portion 3 of the tire. According to the extensive investigations performed by the inventors of the present invention, it has been revealed that the effect of reduction in the cavity resonance sound is greater when the short fibers 9 are bonded onto the inner surface 8 of the sidewall portion 3 than when the short fibers 9 are bonded onto the inner surface 8 of the tread portion 2. Therefore, bonding a number of the short fibers 9 onto the inner surface 8 of the sidewall portion 3 of the tire can further reduce the cavity resonance sound of the pneumatic tire.

The number of short fibers 9 per unit area in the fibrous regions Rfa is preferably 100 fibers/cm$^2$-50,000 fibers/cm$^2$. When the number of short fibers 9 per unit area in the fibrous regions Rfa is 100 fibers/cm$^2$ or more, the effect of reducing the cavity resonance sound can be obtained sufficiently. When the number of short fibers 9 per area unit in the fibrous regions Rfa is more than 50,000 fibers/cm$^2$, the effect of reducing the cavity resonance sound is rather decreased. For the same reasons, the number of short fibers 9 per unit area in the fibrous regions Rfa is more preferably between 1,000 fibers/cm$^2$ and 10,000 fibers/cm$^2$.

The average length L of the short fibers 9 is preferably between 0.5 mm and 10 mm. When the length L is 0.5 mm or more, the effect of reducing the cavity resonance sound can be sufficiently obtained. When the length L is 10 mm or less, the lumps caused by entanglement of the short fibers can be prevented from occurring, and therefore, the effect of reducing cavity resonance sound can be obtained sufficiently. For the same reasons, the average length of the short fibers is preferably between 2 mm and 8 mm.

An average diameter D of the short fibers 9 is preferably between 1 μm and 500 μm. When D is less than 1 μm, the fibers are likely to be broken in the manufacturing process of the short fibers 9. Thus, the productivity of short fibers 9 is reduced, so that the preparation of the short fibers may become difficult. When D is larger than 500 μm, the weight of the tire increases significantly due to the bonded short fibers 9. Thus, the rolling resistance of the tire may be increased to reduce the fuel consumption of the vehicle equipped with the tire. For the same reasons, the average diameter of the short fibers is more preferably between 20 μm and 200 μm.

A ratio L/D of the average length L of the short fibers 9 to the average diameter D of the short fibers 9 is preferably between 5 and 2,000. When the ratio L/D is less than 5, the effect of reducing the cavity resonance sound is less. When the ratio L/D is larger than 2,000, the lumps caused by entanglement of the short fibers may occur, which may hinder the sufficient effect of reducing cavity resonance sound. For the same reasons, the ratio L/D is more preferably between 10 and 1,000.

A material of short fibers 9 may include organic synthetic fiber, inorganic fiber, regenerated fiber and natural fiber. As organic synthetic fiber, polyolefin such as polyethylene, polypropylene, and polybutylene, aliphatic polyamides such as nylon, aromatic polyamide such as Kevlar®, polyester such as polyethylene terephthalate, polyethylene naphthalate, polyethylene succinate, and polymethyl methacrylate, syndiotactic-1,2-polybutadiene, acrylonitrile-butadiene-styrene copolymer, polystyrene, and a copolymer thereof may be cited by way of example. As inorganic fiber, carbon fiber and glass fiber may be cited by way of example. As regenerated fiber, rayon and cupro may be cited by way of example. Further, as natural fiber, cotton, silk, and wool may be cited by way of example.

As the adhesive 10, polyurethane resin adhesive, acrylic resin adhesive, epoxy resin adhesive, and chloroprene rubber-based adhesive may be cited by way of example.

It is noted that, in the pneumatic tire 1 shown in FIG. 1, the carcass 5 consists of a single ply, but it may also include two or more plies as needed. In addition, the carcass 5 of the pneumatic tire shown in FIG. 1 may be either a bias carcass or a radial carcass. It should be noted that two belt layers 6 are provided in the pneumatic tire shown in FIG. 1, but at least one belt layer is required in the pneumatic tire of the present invention.

The adhesive 10 is used to bond the short fibers 9 onto the inner surface 8 of the pneumatic tire 1 in the present embodiment. However, double sided tapes, hook-and-loop fasteners, adhesives and the like can also be used to bond the short fibers onto the inner surface of the tire.

The pneumatic tire of the present invention may be manufactured by any methods well known to persons skilled in the art. The short fibers can be bonded onto the inner surface of the tire with a variety of methods well known to persons skilled in the art. An electrostatic flocking is a preferable method for bonding the short fibers onto the inner surface of the tire. The electrostatic flocking method is a technique where a voltage is applied to the fibers subjected to electrodeposition process, the short fibers are anchored toward an object that has been applied with an adhesive layer, and the short fibers are implanted onto the object perpendicularly. Therefore, the short fibers can be easily uniformly bonded onto the surface of an object with a complicated shape. As a result, the short fibers can be bonded onto the curved inner surface of the tire.

The pneumatic tire of the present invention can be used with methods conventionally known to persons skilled in the art. In addition, the pneumatic tire of the present invention may be repaired by using the composition of puncture sealant or the composition of puncture repair liquid conventionally known to persons skilled in the art.

EXAMPLES

Examples of the present invention are further described below, however, the present invention is not intended to be limited to the below examples.

The example tire 1 is a pneumatic tire (205/55R16) with approximately 20 g of nylon short fibers bonded onto the inner surface of the tire by using an electrostatic flocking process. The nylon short fiber has thickness of 15 denier ($\phi$45 μm) and length of 2.5 mm. The short fibers are bonded so that the tire has three circumferential fiberless regions each having a width of 20 mm in the width direction of the tire. The specifications of the tire of the example tire 1 are shown in Table 1.

The comparative example tire 1 is basically the same as the example tire 1 except that short fibers are not bonded onto the inner surface of the tire. The specifications of the comparative example tire 1 are shown in Table 1. The comparative tire 2 is basically the same as the example tire 1 except that 40 g of nylon short fibers are bonded over the entire inner surface of the tire by using an electrostatic flocking process. The specifications of the comparative tire 2 are shown in Table 1.

(1) Cavity Resonance Sound Evaluation

The pneumatic tires thus prepared are mounted onto applicable rims (6.5JJ-16) defined by JATMA standards, and the tire rim assemblies are mounted on a passenger vehicle of 2,000 cc class. The cavity resonance sound of the pneumatic tire is measured with a microphone placed on an ear of a driver under the condition that the above-mentioned vehicle is driven on an asphalt road having a rough surface at 50 km/h with the internal pressure of 220 kPa and one passenger in the car. The sound pressure level (dB(A)) of the cavity resonance sound of the pneumatic tire is used for the evaluation. The evaluation results are presented in FIG. 2 and Table 1.

Figure 2:
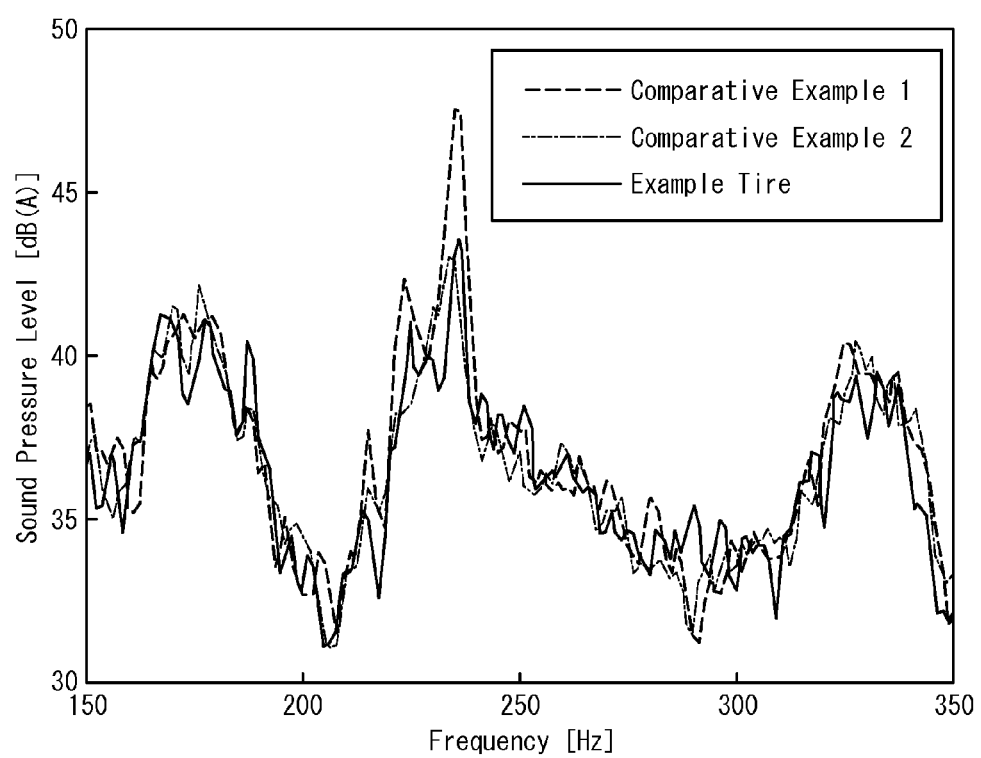
FIG. 2 is a diagram showing a sound pressure level of a cavity resonance sound caused by a pneumatic tire according to one example of the present invention, the sound pressure level being measured with a microphone.

As can be seen in FIG. 2, the peaks near 225 Hz, 235 Hz represent the frequencies of the vehicle interior noise due to the cavity resonance sound phenomenon of the tire. The sound pressure level of the frequencies in the example tire 1 is 2.0 dB to 5.0 dB lower than those in the comparative example tire 1. A significant effect of the pneumatic tire of the present invention on the reduction of cavity resonance sound is presented. In addition, Table 1 shows the amount of reduction of sound pressure level at near peak 235 Hz where the difference is most significantly observed. The larger the amount of reduction of the sound pressure level is, the higher effect of reducing the cavity resonance sound is.

(2) Evaluation of Facilitation of Repair of Puncture Damage

Rim assembled pneumatic tires prepared in the same manner as in (1) are punctured. The punctured tires are repaired with a common puncture repair liquid containing puncture repair sealant. Then, the amounts of required puncture repair liquid are measured. Particularly, the evaluation results are indicated by indices with the comparative example tire 1 being set as a standard 100. The evaluation results are indicated in Table 1. The smaller amount of the puncture repair liquid is used, the easier the puncture repairing with a puncture repair liquid is.

(3) Rolling Resistance Evaluation

Rim assembled pneumatic tires prepared in the same manner as in (1) are rotated on a drum test machine at 100 km/h under the condition that an internal pressure of 220 kPa and a load of 0.425 tons are applied. The rolling resistance of the tire is then evaluated by measuring the deceleration during the freewheel running of the tire. Particularly, the evaluation results are indicated by indices with the comparative example tire 1 being set as a standard 100. The evaluation results are indicated in Table 1. The smaller the indices are, the smaller rolling resistance is, and therefore the more excellent on fuel consumption of the vehicle equipped with the tire.

(4) Steering Stability Evaluation

Pneumatic tires are mounted on a vehicle in the same manner as in (1). The steering stability of the pneumatic tire is evaluated according to the feeling of a test driver while driving on a smooth asphalt road under various driving conditions. Particularly, the evaluation results are indicated by indices with the comparative example tire 1 being set as a standard 100. The evaluation results are indicated in Table 1. The higher the index is, the greater the steering stability is.

Example tires 2, 3 and comparative example tires 2, 3 are also evaluated in the same manner as the example tire 1 and the comparative example tire 1 through the above evaluations (1) to (4).

TABLE 1

|  |  | Comparative Example Tire 1 | Comparative Example Tire 2 | Comparative Example Tire 3 | Example Tire 1 | Example Tire 2 | Example Tire 3 |
|---|---|---|---|---|---|---|---|
| Tire specifications | Figure | — | — | — | — | — | FIG. 1 |
|  | Presence of fibrous region | No | Present | Present | Present | Present | Present |
|  | Presence of fiberless region | Present | No | Present | Present | Present | Present |
|  | Presence of circumferential fiberless region | Present | No | Not | Present | Present | Present |
|  | Location of circumferential fiberless region on tread | Entire tread | — | — | Tread shoulder | Tread center | Tread center |

TABLE 1-continued

|  |  | Comparative Example Tire 1 | Comparative Example Tire 2 | Comparative Example Tire 3 | Example Tire 1 | Example Tire 2 | Example Tire 3 |
|---|---|---|---|---|---|---|---|
|  |  |  |  |  | portion | portion | portion |
|  | T1/S1 | — | 1 | 0.8 | 1 | 0.8 | 1 |
|  | T2/S2 | — | 1 | 0.8 | 0.7 | 0.8 | 0.7 |
|  | Presence of widthwise fiberless region | Present | No | No | No | No | Present |
|  | Material of short fibers | — | Nylon | Nylon | Nylon | Nylon | Nylon |
|  | Number of short fibers per area (unit pieces/cm²) | — | 5000 | 5000 | 5000 | 5000 | 5000 |
|  | Average length of short finbers L (mm) | — | 2.5 | 2.5 | 2.5 | 2.5 | 2.5 |
|  | Average diameter of short fibers D (um) | — | 45 | 45 | 45 | 45 | 45 |
|  | L/D | — | 55.5 | 55.5 | 55.5 | 55.5 | 55.5 |
|  | Forms of short fibers being bonded (continuous/non-continuous) | — | Continuous | Non-continuous | Non-continuous | Non-continuous | Non-continuous |
|  | Fibrous region/ Surface area of inner surface of the tire | — | 1 | 0.8 | 0.8 | 0.8 | 0.8 |
|  | Area of fiberless region/ Area of belt corresponding region | 1 | — | — | 0.2 | 0.2 | 0.2 |
|  | Width of circumferential fiberless region (width for one single region) (mm) | (Tw) | — | — | 10 | 10 | 10 |
| Tire performance | Cavity resonance (low reduction near 235 Hz) (dB(A)) | — | 5.2 | 4 | 4.9 | 4.7 | 4.5 |
|  | Easiness of puncture repair | 100 | 150 | 145 | 110 | 102 | 100 |
|  | Rolling resistance | 100 | 107 | 106 | 102 | 101 | 100 |
|  | Handling stability | 100 | 94 | 94 | 99 | 97 | 99 |

Comparing the example tire 1 with the comparative example tire 3, it is shown that by providing circumferential fiberless regions, the cavity resonance sound can be reduced while facilitating repair of puncture damage. Comparing the example tire 2 with the example tire 1, it is shown that by providing circumferential fiberless regions on the tread center portion, the rolling resistance can be reduced while facilitating repair of puncture damage. Comparing the example tire 3 with the example tire 2, it is shown that when the relationship T1/S1>T2/S2, the decrease in the steering stability can be further suppressed, and/or, by providing widthwise fiberless regions, repair of puncture damage can be further facilitated.

According to the pneumatic tire of the present invention, the cavity resonance sound can be reduced while facilitating repair of puncture damage with puncture sealant.

The invention claimed is:

1. A pneumatic tire having a fibrous region where short fibers are bonded onto an inner surface of the tire comprising:
   a plurality of fiberless regions comprising:
      a circumferential fiberless region where short fibers are not bonded onto the inner surface of the tire, the circumferential fiberless region extending circumferentially, and disposed on the inner surface of the tire within a tread ground contact area, wherein the circumferential fiberless region is situated in a tread center portion and with an equatorial plane of the tire as a center of the width of the circumferential fiberless region, a width of the circumferential fiberless region is 0.05 TW or more and less than 0.5 TW, TW corresponding to a tread contact width, wherein the circumferential fiberless region is bounded by the fibrous region, and
      a widthwise fiberless region where short fibers are not bonded to the inner surface of the tire, the widthwise fiberless region extending widthwise from the circumferential fiberless region; and
   a fiber region comprising a widthwise outer region where short fibers are bonded to the inner surface of the tire, wherein an outer-most edge of the widthwise fiberless region coincides with an outer-most edge of the tread ground contact area, and
   wherein the widthwise outer region extends outwards in a widthwise direction from the widthwise fiberless region.

2. The pneumatic tire according to claim 1, wherein, in a widthwise cross-sectional view of the tire, the circumferential fiberless region is situated in a tread center portion and has a width equal to a tread contact half-width, and with an equatorial plane of the tire as a center of the width of the circumferential fiberless region.

3. The pneumatic tire according to claim 1, further comprising grooves and land portions defined by the grooves on a tread surface, wherein the following relationship is satisfied:

$$T1/S1 > T2/S2,$$

where S1 is an area of groove regions on the inner surface of the tire corresponding to the grooves; S2 is an area of land regions on the inner surface of the tire corresponding to the land portions; T1 is an area of the fibrous region in the groove regions; and T2 is an area of fibrous region in the land region.

4. The pneumatic tire according to claim 1,
   wherein the inner surface of tire comprises a plurality of widthwise fiberless regions, and
   wherein the plurality of widthwise fiberless regions are provided at a constant interval in a circumferential direction of the tread from one another, the circumferential ends of each of the widthwise fiberless regions interposed between fibrous regions.

* * * * *